June 30, 1936.  A. C. FELTON, JR  2,046,112
APPARATUS FOR WASTE MATERIAL DISPOSAL
Filed June 29, 1933  3 Sheets-Sheet 3
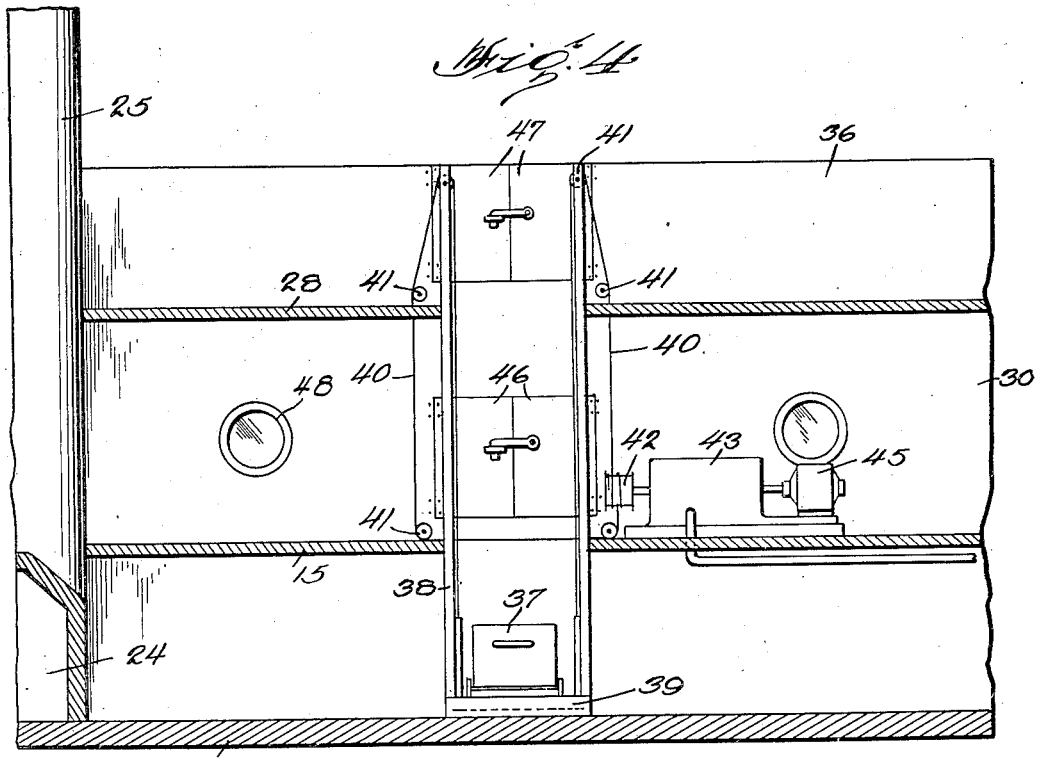
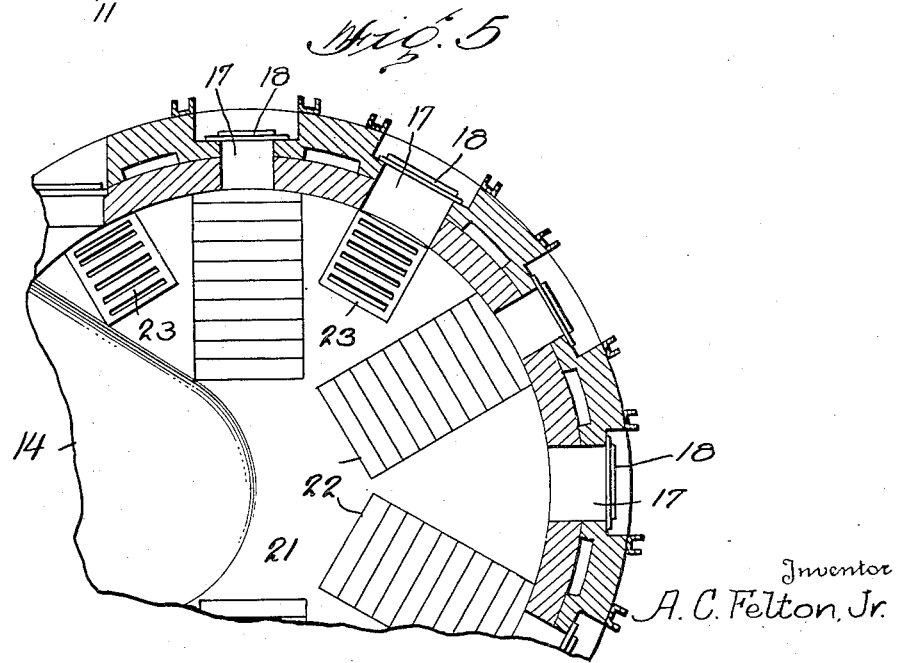
Inventor
A. C. Felton, Jr.
By John L. Baug
Attorney Patented June 30, 1936

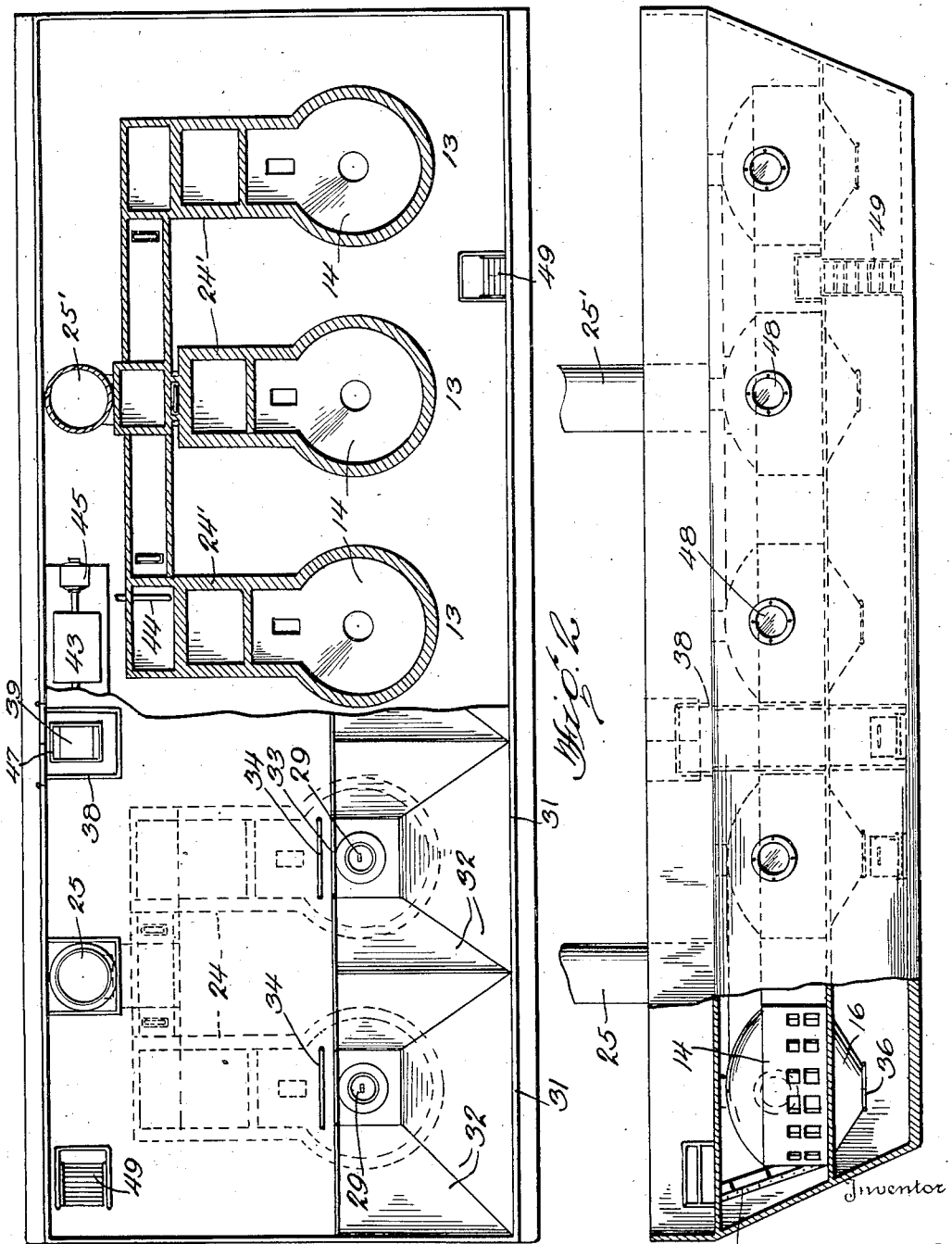

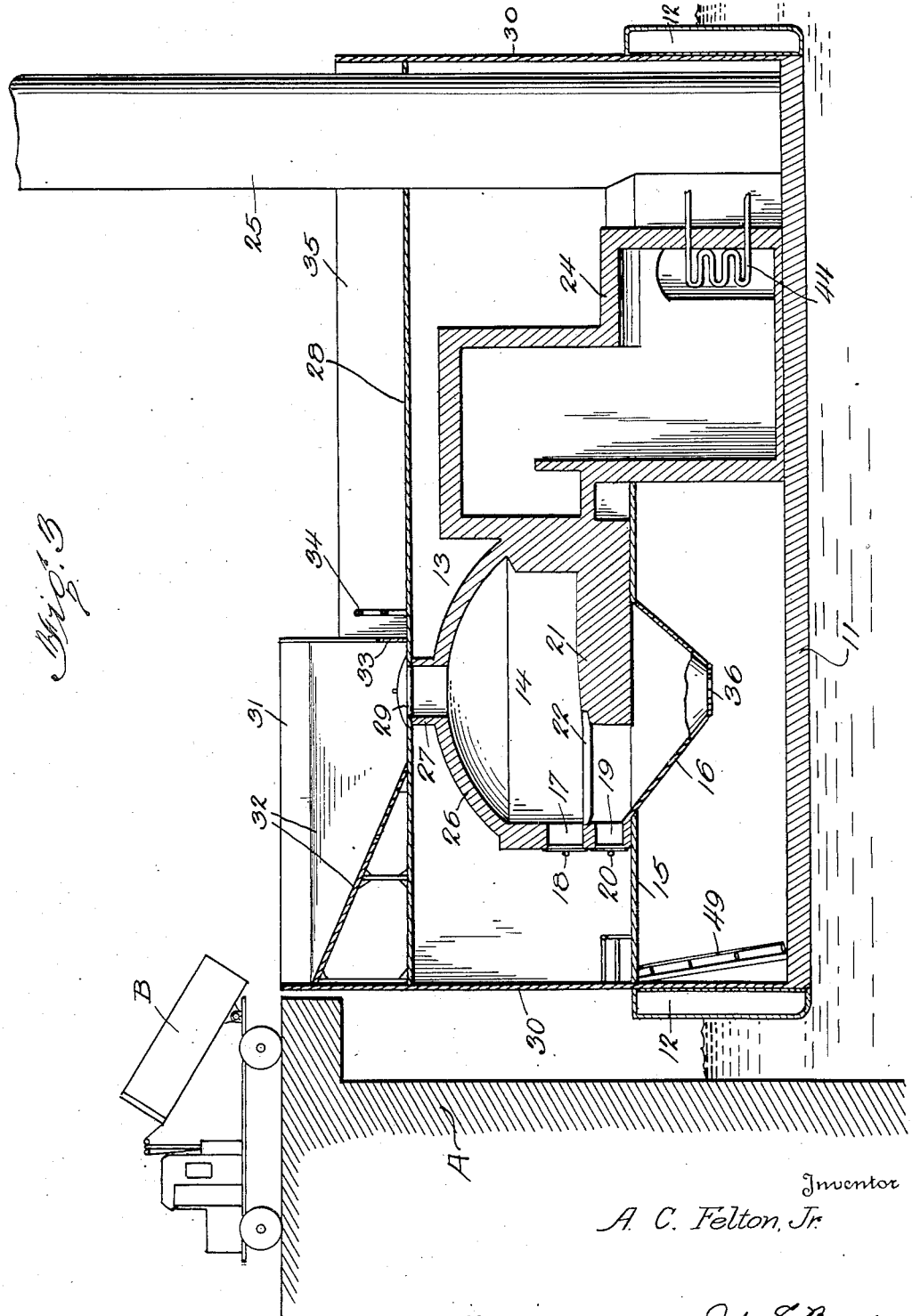

2,046,112

UNITED STATES PATENT OFFICE 2,046,112

APPARATUS FOR WASTE MATERIAL DISPOSAL

Augustus C. Felton, Jr., Macon, Ga.

Application June 29, 1933, Serial No. 678,288

1 Claim. (Cl. 110—8)

This invention appertains to an improvement in an apparatus for waste material disposal, and has for an object to (1) greatly simplify present methods and means for the collection and disposal of garbage and trash in cities and towns and particularly of those located on the banks of navigable waters; (2) appreciably reduce the costs of such collection and disposal; and (3) avoid any and all necessity for the usual pollution of the adjacent waters.

Another object of the invention is to provide an incinerator plant which can be readily moved from one point of use to another, with the view of lessening the size of garbage and trash collection areas and consequently the distance of haul from a point of loading to a selected emplacement of the plant, and maintained in operation, or in condition for instant operation, during its change of location.

A further object resides in the installation of one or more incinerator units, or one or more of unit groups of incinerators, on a barge which is to be floated on waters adjacent to cities and towns and moored at selected points along the water front for the delivery thereto of the collections of garbage and trash from adjacent collection areas.

Still another object of the invention has to do with the provision of a floating incinerator installation having means to facilitate the delivery of collected waste materials thereto and the distribution of such materials to each of the several incinerators forming a standard installation, and also the firing, stoking and removal of ash residue of the incinerators.

Yet another object lies in making each floating incinerator installation self-contained with regard to equipment for crew, lighting and ventilation, and, if and when required, for supplying ignition fuel, either liquid or solid, to the incinerator units.

With these and other equally important objects and advantages in view, the invention resides in the certain new and useful combination, construction and arrangement of devices and parts as will be hereinafter more fully described, set forth in the appended claim, and illustrated in the accompanying drawings, in which:—

Figure 1 is a top plan view, partly in horizontal section, of an embodiment of the invention, Figure 2 is a side elevation, partly in vertical section, showing the interior of the barge and the arrangement therein of one of the incinerator units, Figure 3 is an enlarged, vertical, transverse, section of the barge taken through one of the incinerator units, Figure 4 is an enlarged, fragmentary, vertical, longitudinal, section showing the ash hoist and the power plant for its operation and for furnishing electric current for lighting and other kindred purposes, and, Figure 5 is an enlarged, fragmentary, horizontal, section through one of the incinerator units to show the arrangement of fire grates and stoking doors therein.

Generally, the invention contemplates a method or system for the collection and disposal of waste materials or refuse, such as garbage, trash and the like, in cities and towns situated near bodies of navigable waters, which consists in having vehicles, such as motor trucks, employed to collect the waste materials and after being loaded in a given locality in a city or town, deliver their loads to a near point on the water front and discharge them directly onto the charging deck of an incinerator installed on a barge moored at that point for the purpose.

In carrying out this method or system of refuse collection and disposal, for instance in small cities or towns, a single barge incinerator of suitable capacity may be employed and floated from one mooring point to another, or, in larger cities and towns, several of the barge incinerators will be moored at predetermined distances apart along a water front in order to facilitate a proper and expeditious collection and disposal of the gathered waste materials.

In this way, the use of land or water dumps for city or town refuse, with their unsanitary nature and objectionable odors and pollutions, are avoided, and the refuse is quickly and completely destroyed within the incinerator and substantially simultaneous with its collection and delivery to the incinerator charging deck, leaving only the ash residue after combustion to be disposed of.

Referring to the drawings, wherein like characters of reference designate corresponding parts throughout the several views thereof, the embodiment of the invention, as is exemplified therein, is comprised in a barge 11, of either standard or special construction, and, in any case, is preferably provided with ballast chambers 12 in certain of its walls.

Installed within the barge 11 are one or more incinerator units 13, which combine features of construction and arrangement of parts of the incinerators or crematories shown, described, and claimed, in Letters Patent of the United States numbered 1,462,230 and 1,603,589, which were granted to me on July 17, 1923 and October 19, 1926, respectively; five of the units being here employed and preferably arranged in two groups, one group of two and the other group of three thereof.

The several incinerator units 13 are preferably arranged in spaced relation and in line longitudinally of the barge, and each has a circular furnace portion 14 which is supported upon a stoking deck 15 entirely enclosing the interior of the barge proper. Each furnace 14 has an ash hopper 16 at its lower side and which depends into the bilge of the barge through an opening provided in the deck 15 for that purpose.

Each furnace 14 has its side wall provided with an upper row of stoking openings 17, normally closed by doors 18, and a lower row of clean-out openings 19, normally closed by doors 20. Also, each furnace has its floor 21 provided with a series of openings covered by main radial grates 22 and small grates 23 alternating with the main grates. Alternate pairs of companion stoking and clean-out openings 17 and 19 open through the side wall of a furnace in line with respective grates 22 and 23. Ashes from these grates drop therefrom into the ash hopper 16 for subsequent discharge from the latter and delivery exteriorly of the barge, as will be presently explained.

As best shown in Figure 1, the furnaces 14 of the two unit group thereof are each connected by a flue system 24 to a common stack 25, and, similarly, the furnaces of the three unit group are connected by the flue systems 24' to a common stack 25'.

By this arrangement, the several incinerator units 13 of both groups may be placed in operation at one and the same time, or each group alone, or the incinerator units of each group, may be separately operated, depending on the requirements of the moment. Thus, the costs of maintenance and operation may be kept to a minimum at all times, by the placing in use only, that number of the incinerator units as may be necessary to meet the immediate demands of the refuse collections and deliveries. Again, this arrangement permits of a municipality to provide incinerator equipment, at an initial outlay in money, not only to meet the immediate refuse disposal demands, but also to take care of the increasing needs of its jurisdiction over a period of years.

The furnaces 14 each has a dome-shaped top 26 that is provided with a central opening in communication with a charging chute 27 depending from an opening in the charging deck 28. The upper open end of the chute 27 is normally closed by a door or manhole cover 29, removal of which permits of the feeding of refuse, dumped onto the charging deck 28, directly into a furnace and onto the central portions of its floor 21 and subsequently onto the several grates 22 and 23.

The charging deck 28 entirely overlies the several incinerator units 13 and the stoking deck 15 and is supported from vertical walls 30 rising from the tops of the side and end walls of the barge 11, so that the space between the stoking and charging decks 15 and 28 is completely enclosed to shield the furnaces 14 and give protection to attendants under all weather conditions.

Mounted on top of the charging deck 28 and along the side thereof corresponding to the mooring side of the barge 11 are a series of refuse receiving hoppers 31, one for each of the furnaces 14. These hoppers 31 extend transversely inward of the side edge of the charging deck 28, each for a distance to confine a companion opening of a chute 27 within the inner end portion thereof. The bottom of each hopper 31 is formed with angularly arranged walls 32 which slope inwardly from the front and opposite side walls of the hopper and toward the chute opening to direct refuse dumped thereon to the latter for subsequent discharge downwardly into a furnace 14.

The inner end wall 33 of each hopper 31 is of an appreciably reduced height in order to permit of an attendant to remove and replace a cover 29 of a chute 27 at will and from a position on the charging deck 28 beyond the inner end of the hopper; a suitable implement (not shown) being provided for the use of the attendant for the purpose and, additionally, to stoke the refuse from a hopper and into a chute.

A guard rail 34 is positioned in spaced relation to the inner open end of each hopper 31 to protect an attendant from accidently stepping or falling into the hopper and the opening of a chute 27, the central portion of the inner end wall 33 being of a height sufficient only to prevent any spreading of the refuse beyond the confines of the hopper, such as would otherwise interfere with the work of the attendant and make his footing on the charging deck precarious and uncertain. The vertical side and end walls 30, rising from the top side of the barge 11, will preferably extend above the charging deck 28, as at 35, to form a guard wall about the edge of the deck.

In action, trash and refuse, with or without a garbage content, is dumped directly through the charging chutes 27 and onto the furnace floors 21 where it pyramids and thereafter gradually and continuously feeds onto the several grates 22 and 23 of each furnace. After an initial ignition of the waste material, the combustion action within each furnace is continuous and automatic, and no charging of a furnace with another fuel, liquid or solid, is needed. However, ignition of an initial charge of waste material within a furnace may be accomplished by the building of solid fuel fires on one or more of the grates 23, or by the introduction of oil burners (not shown) through one or more of the stoking openings 17.

Suitable solid fuel bunkers or liquid fuel tanks (not shown) may be provided within the barge structure at points convenient to the stokers' positions at the furnaces 14 on the deck 15, when and if required.

The ash pits or hoppers 16 will have their lower discharge ends normally closed by doors or valves 36 which are arranged to open in a downward direction to facilitate the discharge of ashes therefrom; suitable means being provided within the bilge of the barge for conveying the ashes from the furnaces to a point of disposal exteriorly of the latter.

This ash conveying means will preferably be in the form of one or more wheeled buggies 37 which are to be manually propelled along the bottom deck or floor of the barge and to and from beneath the discharge outlets of the ash pits or hoppers 16 and, upon being filled, to a hoist 38 extending upwardly through the decks 15 and 28 to a point preferably toward the center of the offshore side of the barge. Here, the buggies will be lifted to a place of dumping outboard of the barge side.

As best shown in Figure 4, the hoist will conventionally consist of the usual framework and guides housing a vertically movable platform 39 suspended from lifting cables 40 which are trained over sheaves 41, at the upper end of the framework, and connected to a winding drum 42. This drum will be driven by power derived from a suitable source, either from on board the barge or from on shore.

In the present instance, however, the drum 42 (Figures 1, 3, and 4) is coupled, through a suitable control mechanism (not shown) to the drive shaft of a motor or engine 43, preferably a steam driven engine or turbine which has its steam supply generated preferably in a pipe coil 44 located in one of the flue systems 24 of an incinerator unit 13. An electric generator 45 may also be coupled to the motor or engine 43 for power and lighting purposes and will be employed whenever its current supply is more economical than that to be derived from an established power plant on shore.

Ash dump openings, normally closed by doors 46 and 47, will lead through the wall portions 30 and 35 at the off-shore side of the barge and the hoist framework and immediately above the stoking and charging decks 15 and 28. If the ashes are to be loaded onto a second barge or scow (not shown) brought alongside the off-shore side of the barge 11, the dump openings will be alternately employed to facilitate the dumping and loading operations, as will be well understood.

The vertical side and end walls 30, between the stoking and charging decks 15 and 28, are preferably provided with normally closed port holes 48 for day-lighting and ventilating the interior of the barge 11, and conveniently placed hatches 49 will afford ready access to the several decks, one from the other. The bilge space below the stoking deck 15 will be artificially lighted to facilitate the ash removal operations and it will be properly ventilated in a suitable manner, in addition to the ventilation effects to be obtained through the hatches 49 leading into the space from the stoking deck 15.

The operation of the system and equipment in accordance with the invention, is as follows:—

An incinerator equipped barge 11 will be shifted along a water front, preferably by a tug-boat, and moored alongside a landing, dock, or pier A (Figure 3), in a manner to place the row of refuse receiving hoppers 31 in juxtaposition thereto and whereby collection vehicles or trucks, preferably of the dumping type, as at B, can be run onto the landing A and brought into position to dump their contents directly into the hoppers. Thus, by shifting a single barge to different points on a water front, or mooring a required number at selected points thereon, the collecting of refuse from given areas can be expedited and accomplished at a much lower cost to taxpayers than is usually the case. Also, the destruction of the refuse is performed continuously following the initial delivery of refuse to the hoppers 31, both during the entire period of refuse collection and the shifting of a particular barge from one mooring place to another.

Without further description, it is thought that the features and advantages of the invention will be readily apparent to those skilled in the art, and it will of course be understood that changes in form, proportion and minor details of construction and arrangement may be resorted to, without departing from the spirit of the invention or its scope as claimed.

I claim:—

In an apparatus of the class described, a barge, a deck enclosing the top side of said barge, incinerator furnaces supported in longitudinal alinement on said deck and having their ash pits depending into the bilge of the barge through openings in the deck, a charging floor forming a top deck extending over said barge above said incinerator furnaces and having openings therein leading to the interiors of the latter, hoppers mounted on said charging floor along an edge thereof at the mooring side of said barge for the direct dumping therein and into said charging openings of the content of vehicles employed in the collection of city refuse when the barge is moored at a landing along a water front, said hoppers being substantially open at their inner sides, and a guard rail extending across the open side of each hopper to allow of the hand stoking of waste material from the hoppers and into the said charging openings without danger to an attendant performing the stoking operation.

AUGUSTUS C. FELTON, JR.